United States Patent
Kosaka et al.

(10) Patent No.: US 11,527,750 B2
(45) Date of Patent: Dec. 13, 2022

(54) ACTIVE MATERIAL, BATTERY AND METHOD FOR PRODUCING ACTIVE MATERIAL

(71) Applicant: TOYOTA JIDOSHA KABUSHIKI KAISHA, Toyota (JP)

(72) Inventors: Daichi Kosaka, Susono (JP); Jun Yoshida, Mishima (JP); Tetsuya Waseda, Tokyo-to (JP); Takamasa Otomo, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 16/667,982

(22) Filed: Oct. 30, 2019

(65) Prior Publication Data
US 2020/0176768 A1    Jun. 4, 2020

(30) Foreign Application Priority Data

Nov. 30, 2018 (JP) .............................. JP2018-225810

(51) Int. Cl.
*H01M 4/38*    (2006.01)
*H01M 10/0525*    (2010.01)
*H01M 4/1395*    (2010.01)
*C01B 33/06*    (2006.01)
*H01M 4/02*    (2006.01)

(52) U.S. Cl.
CPC .............. *H01M 4/386* (2013.01); *C01B 33/06* (2013.01); *H01M 4/1395* (2013.01); *H01M 10/0525* (2013.01); *H01M 2004/021* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 6,423,286 B1 * | 7/2002 | Gryko | H01L 29/1608 423/349 |
| 8,968,929 B2 | 3/2015 | Chan et al. | |
| 2009/0263958 A1 * | 10/2009 | Nolas | C23C 14/06 438/478 |
| 2012/0021283 A1 * | 1/2012 | Chan | H01M 4/1395 29/623.5 |
| 2015/0380724 A1 * | 12/2015 | Chan | H01M 4/131 429/50 |

OTHER PUBLICATIONS

U.S. Appl. No. 16/504,210, filed Jul. 5, 2019 by Jun Yoshida et al.
(Continued)

*Primary Examiner* — Robert S Carrico
(74) *Attorney, Agent, or Firm* — Oliff PLC (57) ABSTRACT

A main object of the present disclosure is to provide an active material whose volume variation due to charge and discharge is small. The present disclosure achieves the object by providing an active material comprising a primary particle including at least one crystal phase of a Type I silicon clathrate and a Type II silicon clathrate, and the primary particle includes a void inside thereof.

6 Claims, 5 Drawing Sheets

Type I silicon clathrate

(56) References Cited

OTHER PUBLICATIONS

Kwai S. Chan et al; "Synthesis and Characterization of Silicon Clathrates for Anode Applications in Lithium-Ion Batteries"; Batteries for Advanced Transportation Technologies; Southwest Research Institute; May 2013; pp. 1-19.
Thorsten Langer et al; "Electrochemical Lithiation of Silicon Clathrate-II"; Journal of the Electrochemical Society; vol. 159; No. 8; 2012; pp. A1318-A1322.
Nicholas A. Wagner et al., "Electrochemical Cycling of Sodium-Filled Silicon Clathrate," ChemElectroChem, vol. 1, No. 2, Feb. 11, 2014, pp. 347-353.
Mingyuan GE et al., "Scalable preparation of porous silicon nanoparticles and their application for lithium-ion battery anodes," Nano Research, vol. 6, No. 3 Feb. 6, 2013, pp. 174-181.

\* cited by examiner

FIG. 1A

Type I silicon clathrate

FIG. 1B

Type II silicon clathrate

FIG. 1C

Diamond type silicon

FIG. 2

FIG. 3A
XRD

FIG. 3B
Particle cross-section

FIG. 4A
XRD

FIG. 4B
Particle cross-section

FIG. 5A
XRD

FIG. 5B
Particle cross-section

FIG. 6A
XRD

FIG. 6B
Particle cross-section

FIG. 7A
XRD

FIG. 7B
Particle cross-section

FIG. 8A
XRD

FIG. 8B
Particle cross-section

ACTIVE MATERIAL, BATTERY AND METHOD FOR PRODUCING ACTIVE MATERIAL

TECHNICAL FIELD

The present disclosure relates to an active material, a battery and a method for producing an active material.

BACKGROUND ART

In recent years, the development of a battery has been actively carried out. For example, the development of a battery used for an electric automobile or a hybrid automobile has been advanced in the automobile industry. Also, as the active material used for the battery, Si particles are known.

Patent Literature 1 and Non-patent Literature 1 disclose a lithium ion battery using Type I silicon clathrate as an anode active material. Also, Non-patent Literature 2 discloses a use of a compound including a crystal phase of Type II silicon clathrate as an anode active material of a lithium ion battery.

CITATION LIST

Patent Literatures

Patent Literature 1: U.S. Pat. No. 8,968,929

Non-Patent Literature

Non-patent Literature 1: "Synthesis and Characterization of Silicon Clathrates for Anode Applications in Lithium-Ion Batteries" <URL:https://www.energy.gov/sites/prod/files/2014/03/f13/es149_chan 2013_o.pdf>
Non-patent Literature 2: Thorsten Langer et al., "Electrochemical Lithiation of Silicon Clathrate-II", Journal of The Electrochemical Society, 159(8) A1318-A1322 (2012)

SUMMARY OF DISCLOSURE

Technical Problem

A Si particle is high in theoretical capacity and is effective for increasing the energy density of a battery. Meanwhile, the volume of the Si particle varies greatly upon charge and discharge.

The present disclosure has been made in view of the above circumstances, and a main object thereof is to provide an active material whose volume variation due to charge and discharge is small. Incidentally, the active material in the present disclosure may be referred to as a silicon clathrate compound in some cases.

Solution to Problem

In order to achieve the object, the present disclosure provides an active material comprising a primary particle including at least one crystal phase of a Type I silicon clathrate and a Type II silicon clathrate, and the primary particle includes a void inside thereof.

According to the present disclosure, since the active material includes a void inside the primary particle, the expansion due to charge and discharge may be absorbed. Therefore, the capacity until the confining pressure begins to increase, that is, non-expansion region may be made larger so that the volume variation may also be decreased.

In the disclosure, the crystal phase of the Type I silicon clathrate may have a peak at a position of $2\theta=19.44°\pm1.00°$, $21.32°\pm1.00°$, $30.33°\pm1.00°$, $31.60°\pm1.00°$, $32.82°\pm1.00°$, $36.29°\pm1.00°$, $52.39°\pm1.00°$, and $55.49°\pm1.00°$ in X-ray diffraction measurement using a CuKα ray.

In the disclosure, the crystal phase of the Type II silicon clathrate may have a peak at a position of $2\theta=20.09°\pm1.00°$, $21.00°\pm1.00°$, $26.51°\pm1.00°$, $31.72°\pm1.00°$, $36.26°\pm1.00°$, and $53.01°\pm1.00°$ in X-ray diffraction measurement using a CuKα ray.

In the disclosure, a void ratio inside the primary particle may be 4% or more.

The present disclosure also provides a battery comprising a cathode layer, an electrolyte layer, and an anode layer, in this order, and the anode layer includes the above described active material.

According to the present disclosure, since the anode layer includes the above described active material, a battery whose volume variation due to charge and discharge is small, may be obtained. Accordingly, a battery with excellent battery characteristics such as capacity may be obtained.

The present disclosure further provides a method for producing the above described active material, the method comprising steps of: a preparing step of preparing a precursor compound including at least a Na element and a Si element, and having at least a Zintl phase; and a heat treating step of heat treating the precursor compound, and the heat treating step includes a temperature rising treatment of rising a temperature to a first temperature at a rate of 100° C./min or more under reduced pressure, and after the temperature rising, a burning treatment of burning under reduced pressure.

As described above, in the method for producing an active material in the present disclosure, since the temperature of the precursor compound is risen at a high rising rate, a void may be formed inside the primary particle.

Advantageous Effects of Disclosure

The present disclosure exhibits an effect that an active material whose volume variation due to charge and discharge is small, may be obtained.

DESCRIPTION OF EMBODIMENTS

An active material, a battery and a method for producing an active material in the present disclosure will be hereinafter described in details.

A. Active Material

The active material in the present disclosure comprises a primary particle including at least one crystal phase of a Type I silicon clathrate and a Type II silicon clathrate, and the primary particle includes a void inside thereof.

According to the present disclosure, since the active material includes a void inside the primary particle, the expansion due to charge and discharge may be absorbed. Therefore, the non-expansion region may be made larger so that the volume variation may also be decreased. Particularly for an all solid state battery, it is generally necessary to apply a high confining pressure in order to suppress the volume variation due to charge and discharge. However, by using the active material in the present disclosure, the confining pressure may be reduced; as the result, the enlargement of the confining jig may be suppressed.

Figure 1A:
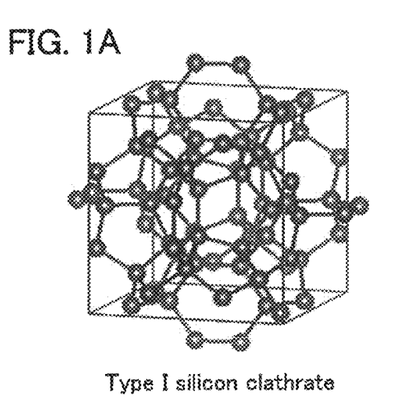
FIGS. 1A to 1C are explanatory drawings illustrating an active material in the present disclosure.
Figure 1B:
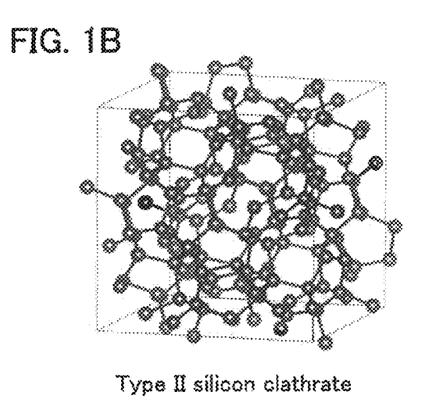
Figure 1C:
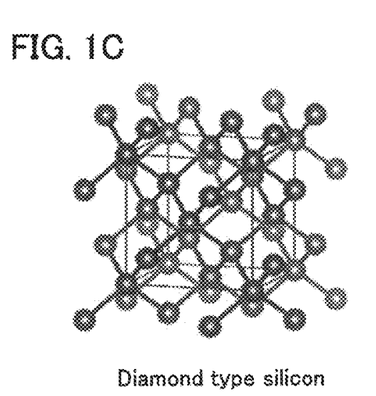
Figure 11:
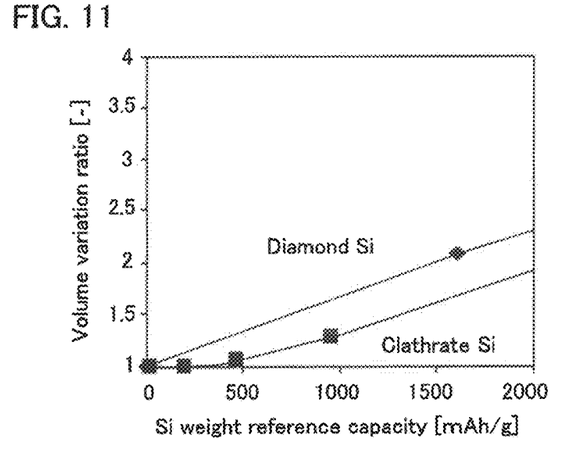
FIG. 11 is a graph showing the relation between capacity and volume variation in an active material, based on a theoretical calculation.

In the crystal phase of Type I and Type II silicon clathrate, as shown in FIGS. 1A and 1B, a polyhedron including a pentagon or a hexagon is formed with a plural of Si elements. The polyhedron has a space within thereof that is capable of including a metal ion such as a Li ion. By a metal ion being intercalated into this space, the volume variation due to charge and discharge may be suppressed. Also, since the crystal phase of Type I and Type II silicon clathrate has the space within thereof that is capable of including a metal ion, there is an advantage that the crystal structure is likely to be maintained although charged and discharged repeatedly. Meanwhile, a usual Si particle includes the crystal phase of a diamond-type. In the crystal phase of the diamond-type, as shown in FIG. 1C, a tetrahedron is formed with a plural of Si elements. Since the tetrahedron does not have a space within thereof that is capable of including a metal ion such as a Li ion, the volume variation due to charge and discharge is large, as shown in FIG. 11. Therefore, application of Type I and Type II silicon clathrate to a battery is being considered.

Figure 10:
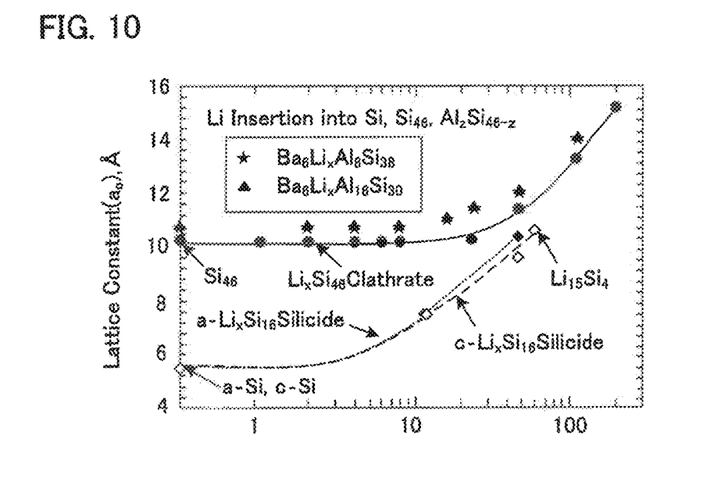
FIG. 10 is a graph showing the simulation of silicon clathrate expansion.

As described above, Non-patent Literature 1 discloses a lithium ion battery using Type I silicon clathrate as an anode active material. Also, Non-patent Literature 1 discloses that the silicon clathrate expands depending on the degree of lithium ion intercalation. It also discloses by way of a simulation that, in relation to $Li_xSi_{46}$ (Type I silicon clathrate), no expansion occurs when $0<x<23$, and expansion occurs when $23<x$ (FIG. 10).

Figure 12:
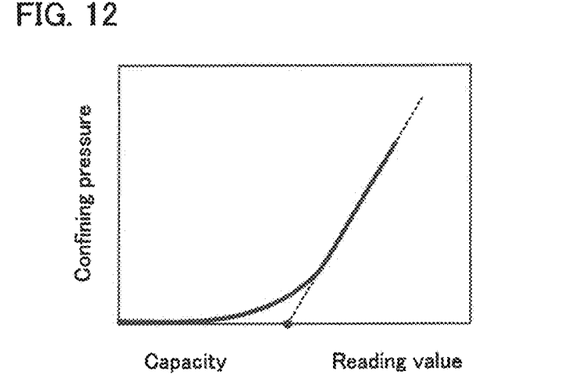
FIG. 12 is a view for explaining the capacity at which the confining pressure begins to increase in a real battery.

The inventors of the present disclosure have calculated this simulation result again in view of "capacity of Si per unit weight" versus "volume variation ratio of Si" (FIG. 11). As the result, the inventors have found out that the expansion begins at the boundary of 480 mAh/g. Meanwhile, in a real battery, the point at which the confining pressure begins to increase is confirmed by reading the value of the intersection of the straight line when the confining pressure is increasing and the "horizontal" line before the expansion (FIG. 12). Therefore, in relation to the confining pressure in a real battery, the increase is believed to begin in a capacity region higher than 480 mAh/g. The reason therefore is presumed that the void inside the electrode absorbs the expansion of the active material. Meanwhile, when the primary particle of the active material is solid, since there is no space to relief the stress applied when the silicon clathrate is expanded due to the intercalation of a lithium ion, it is believed that the expansion of the electrode body cannot be suppressed.

Thus, as the results of further investigation, the inventors of the present disclosure have found that if a void is present inside the primary particle of the active material having the crystal phase of Type I or Type II silicon clathrate, the void may absorb the expansion of the primary particle so that the confining pressure increase in a charged state may be further suppressed.

Incidentally, Patent Literature 1 and Non-patent Literature 1 disclose a lithium ion battery using Type I silicon clathrate as an anode active material. Also, Non-patent Literature 2 discloses a compound including a crystal phase of Type II silicon clathrate. However, any of the Literature discloses nor suggests an active material including a void inside a primary particle.

The active material in the present disclosure comprises a primary particle including at least one crystal phase of a Type I silicon clathrate and a Type II silicon clathrate.

The active material in the present disclosure preferably comprises the crystal phase of Type I or Type II silicon clathrate as a main phase. "Comprising the crystal phase of Type I or Type II silicon clathrate as a main phase" indicates that, among the peaks observed in X-ray diffraction measurement, one of the peak belonging to the crystal phase of Type I or Type II silicon clathrate is the peak with the strongest diffraction intensity. Also, the active material in the present disclosure may include the crystal phase of both Type I and Type II silicon clathrate, and preferably includes the crystal phase of Type I silicon clathrate as a main phase or a single phase. This is because, since Si polyhedrons with large space are included in the crystal phase of Type I silicon clathrate at high rate compared to the crystal phase of Type II silicon clathrate, it is further advantageous in terms of suppressing the volume expansion and maintaining the crystal structure upon the metal ion intercalation. Incidentally, the active material in the present disclosure may include the crystal phase of Type I silicon clathrate and no crystal phase of Type II silicon clathrate.

The crystal phase of Type I silicon clathrate usually belongs to the space group (Pm-3n). Also, the crystal phase of Type II silicon clathrate usually belongs to the space group (Fd-3m). Incidentally, the crystal phase of Type I and Type II silicon clathrate usually include at least a Na element and a Si element; and may or may not include a metal element other than Na.

The crystal phase of the Type I silicon clathrate may have a peak at a position of $2\theta=19.44°$, $21.32°$, $30.33°$, $31.60°$, $32.82°$, $36.29°$, $52.39°$, and $55.49°$ in X-ray diffraction measurement using a CuKα ray. These peak positions may vary respectively in a range of $±1.00°$, may vary in a range of $±0.50°$, and may vary in a range of $±0.30°$. Incidentally, when a metal ion such as a lithium ion is intercalated into the crystal phase of Type I silicon clathrate, for example, the peak may be shifted in some cases. Therefore, the XRD measurement is preferably carried out in the state that the metal ion is not intercalated.

Also, the crystal phase of the Type II silicon clathrate may have a peak at a position of 2θ=20.09°, 21.00°, 26.51°, 31.72°, 36.26°, and 53.01° in X-ray diffraction measurement using a CuKα ray. These peak positions may vary respectively in a range of ±1.00°, may vary in a range of ±0.50°, and may vary in a range of ±0.30°. Also, similarly to the Type I silicon clathrate, the XRD measurement is preferably carried out in the state that the metal ion is not intercalated.

The active material in the present disclosure includes a void inside the primary particle thereof. The void ratio inside the primary particle is, for example, 4% or more, and may be 10% or more. Also, the void ratio is, for example, 40% or less, and may be 20% or less.

In the present disclosure, the void ratio may be determined by, for example, the following procedure. First, a cross-section of an electrode body including an active material is obtained by conducting an ion milling process thereto. Then, the cross-section is observed with a SEM (scanning electron microscope), and a photograph of the particle is taken. In the obtained photograph, the silicon part and the void part are rigidly distinguished and digitalize with an image analyzing software. The areas of the silicon part and the void part are determined, and the void ratio (%) is calculated from the below described formula.

Void ratio (%)=100×(void part area)/((silicon part area)+(void part area))

The specific image analyzing and the calculation of the void ratio may be conducted as described below. As the image analyzing software, for example, Fiji ImageJ bundled with Java 1.8.0_172 (hereinafter, Fiji) is used. The image is colorized into an RGB color image by combining a secondary electron image and a reflection electron image in the same field of view. Then, in order to eliminate the noise of each pixel, the obtained RGB image is blurred with the function of Fiji "median (filter size=2)". Next, with the function of Fiji "Weka Machine Learning", a plurality of arbitrary regions in the noise eliminated image are specified into the silicon part or the void part respectively by a person, and teaching data wherein the silicon part and the void part are rigidly distinguished are formed. Then, based on the formed teaching data, the silicon part and the void part are discriminated with a machine in Fiji, and the area ratio of the silicon part and the void part is calculated.

In relation to the colorizing into the RGB color image, since both of the secondary electron image and the reflection electron image are displayed in a grayscale, the brightness x of each pixel in the secondary electron image is assigned to Red value, and the brightness y in the reflection electron image is similarly assigned to Green value, for example. Thereby, each pixel are colorized into an RGB color image as, for example, R=x, G=y, B=(x+y)/2.

The detailed conditions in "Weka Machine Learning" described above will be hereinafter described.

As training features (numerical features of an image to be focused by a machine when forming teaching data in a machine learning), Gaussian blur, Hessian, Membrane projections, Mean, Maximum, Anisotropic diffusion, Sobel filter, Difference of gaussians, Variance, Minimum, Median are selected. Also, for other parameters, Membrane thickness is set to 3, Membrane patch size is set to 19, Minimum sigma is set to 1.0, and Maximum sigma is set to 16.0.

Examples of the shape of the active material in the present disclosure may include a granular shape. The average primary particle size of the active material is, for example, 50 nm or more, may be 100 nm or more, and may be 150 nm or more. Meanwhile, the average primary particle size of the active material is, for example, 3000 nm or less, may be 1500 nm or less, and may be 1000 nm or less. Also, the average secondary particle size of the active material is, for example, 1 μm or more, may be 2 μm or more, may be 5 μm or more, and may be 7 μm or more. Meanwhile, the average secondary particle size of the active material is, for example, 60 μm or less, and may be 40 μm or less. Incidentally, the average primary particle size and the average secondary particle size may be determined by observation with a SEM, for example. The number of the sample is preferably large; for example, 20 or more, may be 50 or more, and may be 100 or more. The average primary particle size and the average secondary particle size may be adjusted appropriately by, for example, appropriately changing the manufacturing conditions of the active material, and by carrying out a classifying treatment.

The active material in the present disclosure preferably has a composition represented by $Na_xM_ySi_{46}$, wherein M is a metal element other than Na, x and y satisfy $0<x$, $0\leq y$, $y \leq x$ and $0<x+y<8$. M is a metal element other than Na, and examples thereof may include an alkali metal element. Examples of the alkali metal element may include a Li element, a K element, a Rb element, and a Cs element. Also, other examples of M may include an alkaline earth metal element. Examples of the alkaline earth metal element may include a Mg element, a Ca element, a Sr element, and a Ba element. Further, other examples of M may include Group 11 elements such as a Cu element, a Ag element, and a Au element; Group 12 elements such as a Zn element; Group 13 elements such as a B element, an Al element, a Ga element, an In element, and a Tl element; Group 14 elements such as a Ge element; Group 15 elements such as a Sb element; Group 16 elements such as a Te element; lanthanoids such as a La element and an Eu element. Also, as M, transition metal elements such as a Ni element may be used.

The x usually satisfies $0<x$, and may satisfy $0.1 \leq x$. Meanwhile, the x satisfies, for example, $x<8$, may satisfy $x \leq 7$, may satisfy $x \leq 6$, may satisfy $x \leq 5$, may satisfy $x \leq 4$, may satisfy $x \leq 3$ and may satisfy $x \leq 2$. Also, the y may be 0, and may satisfy $0<y$. Also, the x and the y satisfy $y \leq x$. The mole proportion of the x to the total of the x and the y, that is $x/(x+y)$, is usually 0.5 or more, may be 0.7 or more, and may be 0.9 or more.

The total (x+y) of the x and the y usually satisfies $0<x+y$, may satisfy $0.1 \leq x+y$ and may satisfy $0.5 \leq x+y$. Meanwhile, x+y satisfies, for example, $x+y<8$, may satisfy $x+y \leq 7$, may satisfy $x+y \leq 6$, may satisfy $x+y \leq 5$, may satisfy $x+y \leq 4$, may satisfy $x+y \leq 3$ and may satisfy $x+y \leq 2$.

The active material in the present disclosure may be produced according to "C. Method for producing active material" described below. Also, the active material in the present disclosure is usually used for a battery. The battery is described in detail in "B. Battery" below. Also the active material in the present disclosure may be an anode active material, may be a cathode active material, and the former is preferable.

B. Battery

Figure 2:
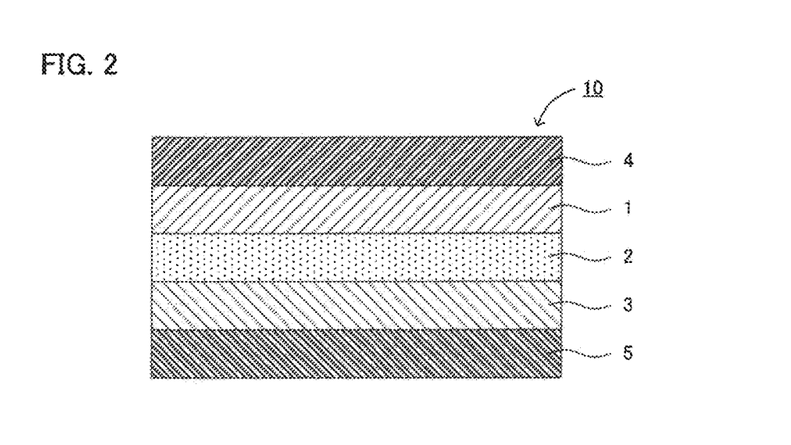
FIG. 2 is a schematic cross-sectional view illustrating an example of a battery in the present disclosure.

FIG. 2 is a schematic cross-sectional view illustrating an example of the battery in the present disclosure. Battery 10 shown in FIG. 2 comprises cathode layer 1, electrolyte layer 2, and anode layer 3, in this order in the thickness direction. Further, battery 10 comprises cathode current collector 4 for collecting currents of cathode layer 1, and anode current collector 5 for collecting currents of anode layer 3. Incidentally, battery 10 may comprise a known outer packing, although not particularly shown in the figure. In the present disclosure, a characteristic is that anode layer 3 includes the active material described in "A. Active material" above.

According to the present disclosure, since the anode layer includes the above described active material (silicon clathrate compound), the volume variation of the battery due to charge and discharge may be decreased. Therefore, a battery having good battery properties such as capacity may be obtained.

1. Anode Layer

The anode layer is a layer including at least an anode active material. In the present disclosure, the active material (silicon clathrate compound) described in "A. Active material" above is used as the anode active material.

The anode layer may include just the silicon clathrate compound as the anode active material, and may include other active material. In the latter case, the proportion of the silicon clathrate compound in the total anode active material may be, for example, 50 weight % or more, may be 70 weight % or more, and may be 90 weight % or more.

The proportion of the anode active material in the anode layer is, for example, 20 weight % or more, may be 30 weight % or more, and may be 40 weight % or more. Meanwhile, the proportion of the anode active material is, for example, 80 weight % or less, may be 70 weight % or less, and may be 60 weight % or less.

Also, the anode layer may include at least one of an electrolyte, a conductive material, and a binder as required. The electrolyte will be described in detail in "3. Electrolyte layer" later. Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, examples of the binder may include rubber-based binders and fluorine-based binders.

The thickness of the anode layer is, for example, 0.1 μm or more and 1000 μm or less.

2. Cathode Layer

The cathode layer is a layer containing at least a cathode active material. Also, the cathode layer may contain at least one of an electrolyte, a conductive material, and a binder, as necessary.

Examples of the cathode active material may include an oxide active material. Examples of the oxide active material used for a lithium ion battery may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$.

Also, a coating layer including a Li ion conductive oxide may be formed on the surface of the oxide active material. The reason therefor is to suppress the reaction of the oxide active material with the solid electrolyte (particularly sulfide solid electrolyte). Examples of the Li ion conductive oxide may include lithium niobates such as $LiNbO_3$; lithium titanates such as $Li_4Ti_5O_{12}$; lithium tungstates such as $LiWO_3$; lithium tantalites such as $LiTaO_3$; lithium molybdates such as $LiMoO_3$; and lithium phosphates such as $Li_3PO_4$. Further, the later described oxide solid electrolyte may be used as the Li ion conductive oxide. The thickness of the coating layer is, for example, 1 nm or more. Meanwhile, the thickness of the coating layer is, for example, 30 nm or less, and may be 15 nm or less.

Meanwhile, examples of the oxide active material used for a sodium ion battery may include an $O_3$ type layered active material, a $P_2$ type layered active material, a $P_3$ type layered active material, and alluaudite type active material.

Examples of the shape of the cathode active material may include a granular shape. The average particle size ($D_{50}$) of the cathode active material is not particularly limited; is, for example, 10 nm or more, and may be 100 nm or more. Meanwhile, the average particle size ($D_{50}$) of the cathode active material is, for example, 50 μm or less, and may be 20 μm or less. Incidentally, the average particle size ($D_{50}$) may be calculated from the measurement by, for example, a laser diffraction type particle size distribution meter, and a scanning electron microscope (SEM).

The proportion of the cathode active material in the cathode layer is, for example, 20 weight % or more, may be 30 weight % or more, and may be 40 weight % or more. Meanwhile, the proportion of the cathode active material is, for example, 80 weight % or less, may be 70 weight % or less, and may be 60 weight % or less.

The conductive material and the binder used for the cathode layer may be in the same contents as those described in "1. Anode layer" above; thus, the description herein is omitted. Meanwhile, the electrolyte used for the cathode layer will be described in detail in "3. Electrolyte layer" later.

The thickness of the cathode layer is, for example, 0.1 μm or more and 1000 μm or less.

3. Electrolyte Layer

The electrolyte layer is a layer formed between the cathode layer and the anode layer, and includes at least an electrolyte. The electrolyte may be a solid electrolyte, may be an electrolyte solution (liquid electrolyte), and may be a mixture thereof. The kind of the electrolyte is not particularly limited, and may be appropriately selected according to the kind of the battery.

Typical examples of the solid electrolyte may include inorganic solid electrolytes such as sulfide solid electrolyte, oxide solid electrolyte, nitride solid electrolyte, and halide solid electrolyte; and organic polymer electrolytes such as polymer electrolyte.

Examples of the sulfide solid electrolyte having lithium ion conductivity may include solid electrolyte including a Li element, an X element (X is at least one kind of P, As, Sb, Si, Ge, Sn, B, Al, Ga, and In) and a S element. Also, the sulfide solid electrolyte may further include at least either one of an O element and a halogen element. Examples of the halogen element may include a F element, a Cl element, a Br element, and an I element. Examples of the oxide solid electrolyte having lithium ion conductivity may include solid electrolyte including a Li element, an Y element (Y is at least one kind of Nb, B, Al, Si, P, Ti, Zr, Mo, W, and S) and an O element.

Examples of the oxide solid electrolyte having sodium ion conductivity may include nasicon type solid electrolyte, perovskite type solid electrolyte, and β alumina. Also, examples of the nitride solid electrolyte having lithium ion conductivity may include $Li_3N$. Examples of the halide solid electrolyte having lithium ion conductivity may include LiCl, LiI, LiBr, and $Li_3YCl_6$.

The liquid electrolyte preferably includes a supporting salt and a solvent. Examples of the supporting salt (lithium salt) of the liquid electrolyte having lithium ion conductivity may include inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_5SO_2)_2$, $LiN(FSO_2)_2$, and $LiC(CF_3SO_2)_3$. Meanwhile, examples of the supporting salt (sodium salt) of the liquid electrolyte having sodium ion conductivity may include inorganic sodium salts such as $NaPF_6$, $NaBF_4$, $NaClO_4$, and $NaAsF_6$; and organic sodium salts such as $NaCF_3SO_3$, $NaN(CF_3SO_2)_2$, $NaN(C_2F_5SO_2)_2$/$NaN(FSO_2)_2$, and $NaC(CF_3SO_2)_3$.

The solvent used for the liquid electrolyte is not particularly limited, and is preferably a mixed solvent including a high-permittivity solvent and a low-viscosity solvent. Examples of the high-permittivity solvent may include cyclic esters (cyclic carbonates) such as ethylene carbonate (EC), propylene carbonate (PC), and butylene carbonate (BC), γ-butyrolactone, sulfolane, N-methylpyrrolidone (NMP), and 1, 3-dimethyl-2-imidazolidinone (DMI). Meanwhile, examples of the low-viscosity solvent may include chain esters (chain carbonates) such as dimethyl carbonate (DMC), diethyl carbonate (DEC), and ethylmethyl carbonate (EMC); acetates such as methyl acetate, and ethyl acetate; and ethers such as 2-methyltetrahydrofuran. Incidentally, the solvent used for the liquid electrolyte may be a non-aqueous solvent, and may be an aqueous solvent. Also, the electrolyte layer may include a separator.

The thickness of the electrolyte layer is, for example, 0.1 μm or more and 1000 μm or less.

4. Other Constitutions

The battery in the present disclosure comprises at least the above described anode layer, cathode layer, and electrolyte layer. Further, the battery in the present disclosure usually comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon.

Also, the battery in the present disclosure may further include a confining jig that applies a confining pressure along the thickness direction, to the cathode layer, the electrolyte layer and the anode layer. A known jig may be used as the confining jig. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. Battery

The battery in the present disclosure is usually a battery in which a metallic ion is conducted between the cathode layer and the anode layer. Examples of such battery may include a lithium ion battery, a sodium ion battery, a potassium ion battery, a magnesium ion battery, and a calcium ion battery. Also, the battery in the present disclosure may be a liquid battery in which the electrolyte layer includes a liquid electrolyte, and may be an all solid state battery in which the electrolyte layer includes a solid electrolyte.

Also, the battery in the present disclosure may be a primary battery and may be a secondary battery; above all, preferably the secondary battery so as to be repeatedly charged and discharged, and be useful as a car-mounted battery, for example. The secondary battery includes the use of a secondary battery as a primary battery (use for the purpose of the first charge only).

Also, the battery in the present disclosure may be a single cell battery and may be a stacked battery. The stacked battery may be a monopolar type stacked battery (a stacked battery connected in parallel), and may be a bipolar type stacked battery (a stacked battery connected in series).

Examples of the shape of the battery may include a coin shape, a laminate shape, a cylindrical shape, and a square shape.

C. Method for Producing Active Material

The method for producing an active material in the present disclosure is a method for producing the above described active material, the method comprising steps of: a preparing step of preparing a precursor compound including at least a Na element and a Si element, and having at least a Zintl phase; and a heat treating step of heat treating the precursor compound, and the heat treating step includes a temperature rising treatment of rising a temperature to a first temperature at a rate of 100° C./min or more under reduced pressure, and after the temperature rising, a burning treatment of burning under reduced pressure.

According to the present disclosure, the temperature of the prepared precursor compound is risen to the first temperature at a high rising rate of 100° C./min or more. Therefore, an active material including a void inside the primary particle may be produced. Incidentally, although the mechanism of the void occurrence in the method for producing in the present disclosure is not specifically clear, it is presumed that the Na element in the Zintl phase is volatilized at once by rising the temperature at high rate.

1. Preparing Step

The preparing step in the present disclosure is a step of preparing a precursor compound including at least a Na element and a Si element, and having at least a Zintl phase.

The precursor compound has a Zintl phase. The Zintl phase has a typical peak at a position of 2θ=16.10°, 16.56°, 17.64°, 20.16°, 27.96°, 33.60°, 35.68°, 40.22°, and 41.14° in X-ray diffraction measurement using a CuKα ray. These peak positions may vary respectively in a range of ±1.00°, may vary in a range of ±0.50°, and may vary in a range of ±0.30°.

Also, the precursor compound may or may not include the crystal phase of Type I silicon clathrate. Similarly, the precursor compound may or may not include the crystal phase of Type II silicon clathrate.

The precursor compound preferably has a composition represented by $Na_xM_ySi_{46}$, wherein M is a metal element other than Na, x and y satisfy $8 \leq x$, $0 \leq y$, $y \leq x$ and $8 < x+y \leq 50$. M is described above.

The x usually satisfies $8 < x$, may satisfy $20 \leq x$, and may satisfy $40 \leq x$. Meanwhile, the x satisfies, for example, $x \leq 50$, and may satisfy x 46. Also, the y may be 0, and may satisfy $0 < y$. Also, the x and the y satisfy $y \leq x$. The mole proportion of the x to the total of the x and the y, that is $x/(x+y)$, is usually 0.5 or more, may be 0.7 or more, and may be 0.9 or more.

The total (x+y) of the x and the y usually satisfies $8 < x+y$, may satisfy $20 \leq x+y$ and may satisfy $40 \leq x+y$. Meanwhile, x+y satisfies, for example, $x+y \leq 50$, and may satisfy $x+y \leq 46$.

The precursor compound may be obtained, for example, by heat treating a raw material mixture including Na simple substance and Si simple substance. The raw material mixture may or may not include a simple substance of the M element. The proportion of Si simple substance and Na simple substance is not particularly limited, and the Na simple substance is, for example, 0.8 mole parts or more, may be 1 mole part or more and may be 1.1 mole parts or more, to 1 mole part of the Si simple substance. Meanwhile, the Na simple substance is, for example, 1.5 mole parts or less, may be 1.3 mole parts or less and may be 1.2 mole parts or less, to 1 mole part of the Si simple substance.

The temperature in the heat treatment is, for example, 500° C. or more and 1000° C. or less. Also, the heat treating time is, for example, 1 hour or more and 50 hours or less. Particularly, it is preferable to conduct the heat treatment under at least one of the conditions of approximately 700° C. (such as 650° C. or more and 750° C. or less) and approximately 20 hours (such as 15 hours or more and 25 hours or less).

2. Heat Treating Step

The heat treating step in the present disclosure is a step of heat treating the prepared precursor compound, and includes a temperature rising treatment of rising a temperature to a first temperature at a rate of 100° C./min or more under reduced pressure, and after the temperature rising, a burning treatment of burning under reduced pressure.

The temperature rising treatment and the burning treatment are conducted under reduced pressure. The pressure is not particularly limited if the active material in the present disclosure is obtained. For example, the pressure is 10 Pa or less, may be 1 Pa or less, and may be 0.1 Pa or less. Also, the pressure may be the same or may be different in the temperature rising treatment and in the burning treatment; the pressure is preferably the same.

At first, in the heat treating step in the present disclosure, the temperature of the precursor compound is risen to the first temperature at a rate of 100° C./min or more under the reduced pressure (temperature rising treatment). The rising rate may be 150° C./min or more and may be 200° C./min or more. The rising rate is not particularly limited if the active material in the present disclosure is obtained, and is, for example, less than 450° C./min and may be 400° C./min or less. Also, the starting temperature before rising may be normal temperature. The first temperature is not particularly limited if the active material in the present disclosure is obtained, and is preferably, for example, 100° C. or more and 650° C. or less, and particularly preferably approximately 450° C. (such as 400° C. or more and 500° C. or less).

Next, the precursor compound is burned (burning treatment). The burning temperature is not particularly limited, may be the same as or different from the first temperature, and it is preferably the same as the first temperature. Also, the burning time is not particularly limited, and may be, for example, 30 minutes or more and 120 hours or less.

Incidentally, the crystal phase of Type I silicon clathrate is likely to be obtained by burning under at least one of the conditions of approximately 450° C. (such as 400° C. or more and 500° C. or less) and approximately 5 hours (such as 2 hours or more and 8 hours or less). Also, the crystal phase of Type II silicon clathrate may be obtained by further removing the Na element from the crystal phase of Type I silicon clathrate. Therefore, when producing an active material including the crystal phase of Type II silicon clathrate, the burning time may be appropriately adjusted, for example, setting the time to 20 hours or more.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Synthesis of Active Material

Si particles (of the purity of 99.999%) and metallic Na (of the purity of 99.5%) were weighed so as to be Si particles: the metallic Na=1:1.1 in the molar ratio, added to a crucible made of boron nitride, and sealed under an Ar atmosphere. After that, a heat treatment was carried out at 700° C. for 20 hours. Thereby, an agglomerated NaSi compound (precursor compound) including Zintl phase was obtained. The obtained NaSi compound was crushed.

The crushed NaSi compound was heated from normal temperature to 450° C. at rising rate of 100° C./min, in a container while vacuuming. Maintaining the constant temperature of 450° C., the compound was burned for 5 hours while vacuuming. Thereby, silicon clathrate powder was obtained. The obtained silicon clathrate powder was crushed to obtain an active material A (average secondary particle size=5 μm) and an active material B (average secondary particle size=3 μm).

Production of Anode 0.4 g of solid electrolyte particles ($0.75Li_2S-0.25P_2S_5$), 0.8 g of the active material A as the anode active material, 0.06 g of a conductive material (VGCF), and 0.32 g of a binder (a butyl butyrate solution containing a PVDF-based resin of 5 weight %) were added to a container made of polypropylene. An ultrasonic treatment was carried out to the container in an ultrasonic dispersion apparatus for 30 seconds, then, a shaking treatment was carried out by using a shaker for 30 minutes to prepare an anode mixture raw material A with relatively high anode active material content.

0.7 g of solid electrolyte particles ($0.75Li_2S-0.25P_2S_5$), 0.6 g of the active material B as the anode active material, 0.06 g of a conductive material (VGCF), and 0.24 g of a binder (a butyl butyrate solution containing a PVDF-based resin of 5 weight %) were added to a container made of polypropylene. An ultrasonic treatment was carried out to the container in an ultrasonic dispersion apparatus for 30 seconds, then, a shaking treatment was carried out by using a shaker for 30 minutes to prepare an anode mixture raw material B with relatively low anode active material content.

The anode mixture raw material A was pasted on a current collector (Cu foil) by a blade method using an applicator, dried naturally for 60 minutes. Then, the anode mixture raw material B was pasted on the surface of the naturally dried anode mixture raw material A by a blade method using an applicator, dried naturally for 60 minutes to obtain an anode precursor. The obtained anode precursor was dried for 30 minutes on a hot plate at 100° C. to prepare an anode.

Production of Cathode 0.3 g of solid electrolyte particles ($0.75Li_2S-0.25P_2S_5$), 2 g of cathode active material particles ($LiNi_{1/3}Co_{1/3}Mn_{1/3}O_2$), 0.03 g of a conductive material (VGCF), and 0.3 g of a binder (a butyl butyrate solution containing a PVDF-based resin of 5 weight %) were added to a container made of polypropylene. An ultrasonic treatment was carried out to the container in an ultrasonic dispersion apparatus for 30 seconds, then, a shaking treatment was carried out by using a shaker for 30 minutes to prepare a cathode mixture raw material. The prepared cathode mixture raw material was pasted on a current collector (aluminum foil) by a blade method using an applicator, dried naturally for 60 minutes to obtain a cathode precursor. The obtained cathode precursor was dried for 30 minutes on a hot plate at 100° C. to produce a cathode.

Production of Solid Electrolyte Layer 0.4 g of solid electrolyte particles (0.75Li$_2$S-0.25P$_2$S$_5$, average particle size of 2 μm) and 0.05 g of a binder (a heptane solution containing an ABR based resin of 5 weight %) were added to a container made of polypropylene. An ultrasonic treatment was carried out to the container in an ultrasonic dispersion apparatus for 30 seconds, then, a shaking treatment was carried out by using a shaker for 30 minutes to prepare a solid electrolyte material paste. The prepared solid electrolyte material paste was pasted on a supporting base (Al foil) by a blade method using an applicator, dried for 30 minutes on a hot plate adjusted to be 100° C. to produce a solid electrolyte layer.

Production of Evaluation Battery

The obtained anode, solid electrolyte layer, and cathode were stacked in this order so as to contact to each other. The obtained stack was pressed under conditions of 130° C. and 200 MPa for 3 minutes to produce an evaluation battery (all solid state battery).

Examples 2 to 4 and Comparative Example 1

An active material was synthesized and an evaluation battery was produced in the same manner as in Example 1, except that the rising rate was changed to that shown in Table 1.

Comparative Example 2

An evaluation battery was produced in the same manner as in Example 1, except that Si particles (average secondary particle size=3 μm) with a diamond structure was used as the anode active material.

TABLE 1

| | Degree of vacuum (Pa) | Rising rate (° C./min) | Vacuuming Temperature (° C.) | Burning time (h) | Anode active material composition |
|---|---|---|---|---|---|
| Example 1 | 0.1 | 100 | 450 | 5 | — |
| Example 2 | 0.1 | 200 | 450 | 5 | — |
| Example 3 | 0.1 | 300 | 450 | 5 | — |
| Example 4 | 0.1 | 400 | 450 | 5 | Na$_{4.2}$Si$_{46}$ |
| Comp. Ex. 1 | 0.1 | 15 | 450 | 5 | Na$_{4.6}$Si$_{46}$ |
| Comp. Ex. 2 | — | — | — | — | — |

Incidentally, the composition of the active materials produced in Example 4 and Comparative Example 1 was confirmed by measuring Na/Si by way of a SEM-EDX (scanning electron microscope-energy dispersive X-ray spectroscopy) measurement. The composition of the active materials are shown in Table 1.

[Evaluation]

Void Inside Primary Particle

An electrode body was produced by using the active material synthesized in Examples and in Comparative Examples. The cross-section of the produced electrode body was obtained by conducting an ion milling process thereto. The cross-section was observed with SEM, and a photograph of the particle was taken. In the obtained photograph of the particle, the Si part and the void part were rigidly distinguished, digitalized by the below described image analyzing software (Fiji), and calculated the void ratio from the below described calculating formula. The primary particle images are shown in FIGS. 3B to 8B, and the void ratios are shown in Table 2.

Void ratio (%)=100×(void part area)/((Si part area)+ (void part area))

As shown in FIGS. 3B to 8B and Table 2, the voids were confirmed inside the primary particle in Examples 1 to 4. However, the void was not confirmed in Comparative Examples. Particularly, although the sample in Comparative Example 1 has the crystal phase of Type I silicon clathrate from the result of the later described XRD measurement, the void was not confirmed inside the primary particle.

XRD Measurement

Figure 3A:
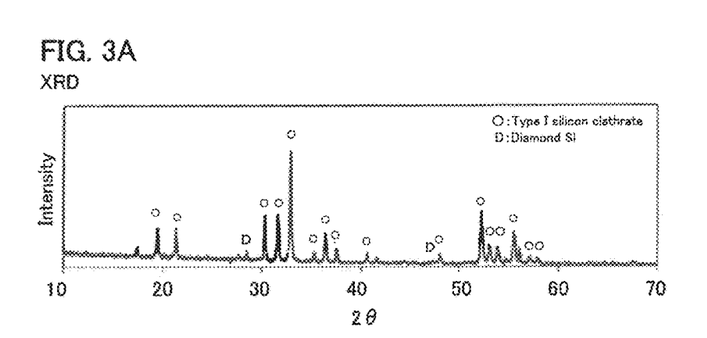
FIG. 3A is the results of an XRD measurement for the active material obtained in Example 1.
Figure 3B:
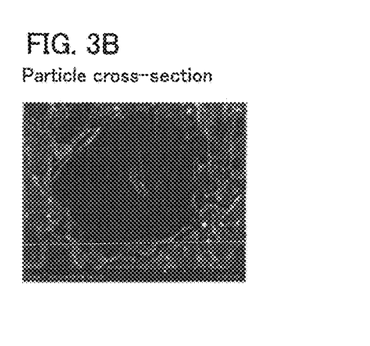
FIG. 3B is the cross-sectional photograph of the active material particle.
Figure 4A:
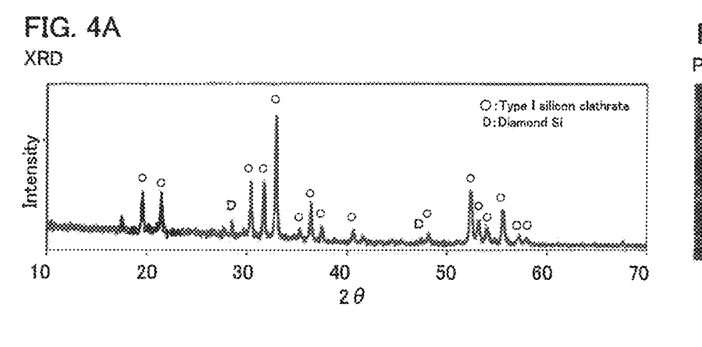
FIG. 4A is the results of an XRD measurement for the active material obtained in Example 2.
Figure 4B:
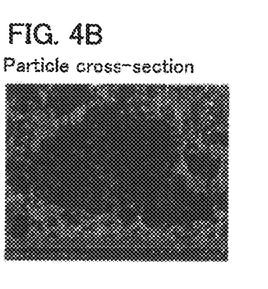
FIG. 4B is the cross-sectional photograph of the active material particle.
Figure 5A:
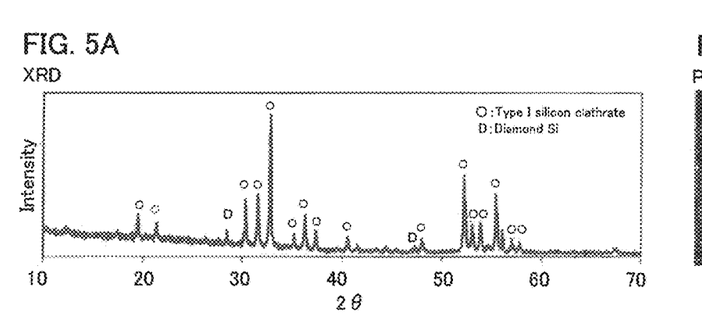
FIG. 5A is the results of an XRD measurement for the active material obtained in Example 3.
Figure 5B:
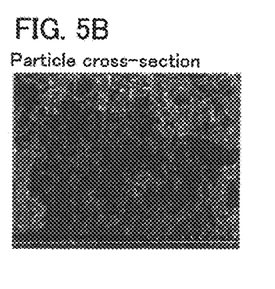
FIG. 5B is the cross-sectional photograph of the active material particle.
Figure 6A:
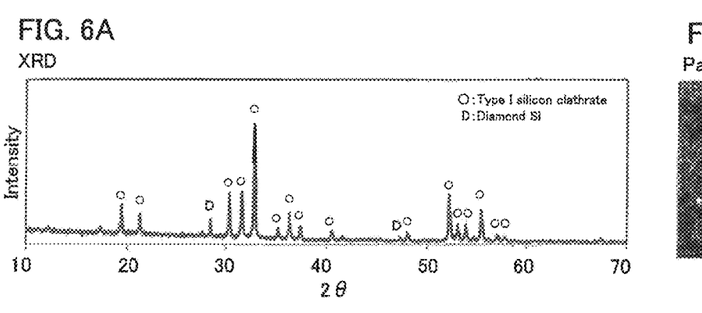
FIG. 6A is the results of an XRD measurement for the active material obtained in Example 4.
Figure 6B:
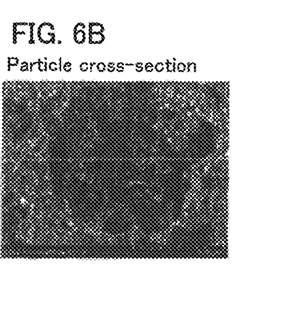
FIG. 6B is the cross-sectional photograph of the active material particle.
Figure 7A:
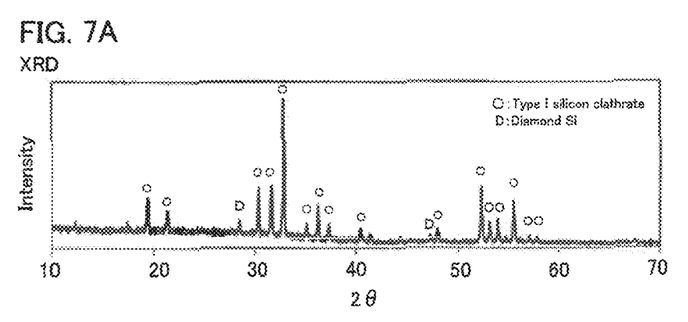
FIG. 7A is the results of an XRD measurement for the active material obtained in Comparative Example 1.
Figure 7B:
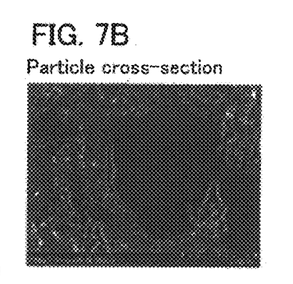
FIG. 7B is the cross-sectional photograph of the active material particle.
Figure 8A:
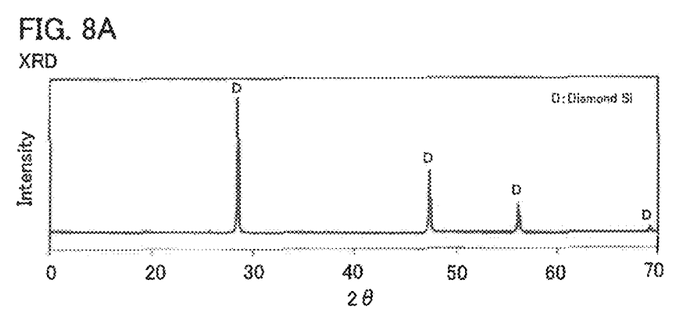
FIG. 8A is the results of an XRD measurement for the active material obtained in Comparative Example 2.
Figure 8B:
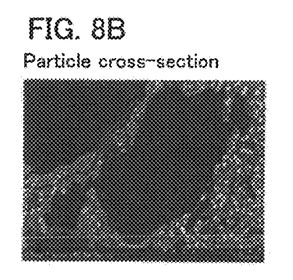
FIG. 8B is the cross-sectional photograph of the active material particle.

An X-ray diffraction (XRD) measurement using a CuKα ray was carried out for each active material obtained in Examples 1 to 4 and Comparative Examples 1 and 2. The results thereof are shown in FIGS. 3A and 8A. As shown in FIGS. 3A to 7A, typical peaks of the crystal phase of Type I silicon clathrate were confirmed in Examples 1 to 4 and Comparative Example 1. Also, in Examples 1 and 2 and Comparative Example 1, the peaks of Si crystal phase of a diamond type were slightly confirmed. Meanwhile, as shown in FIG. 8A, the peak of the crystal phase of Type I silicon clathrate was not confirmed in Comparative Example 2.

Charge and Discharge Test

Figure 9:
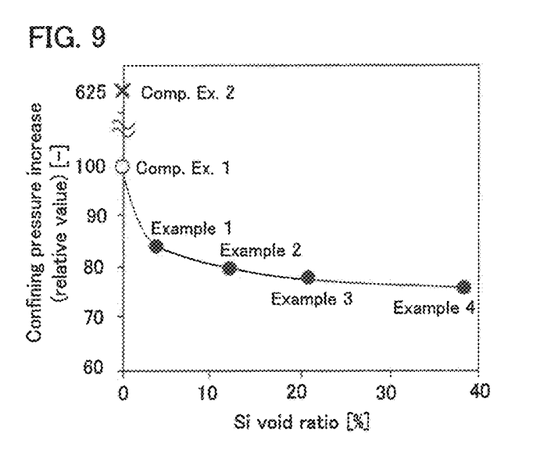
FIG. 9 is a graph showing the relation between void ratio and confining pressure increase.

A charge and discharge test was carried out for each evaluation battery obtained in Examples 1 to 4 and Comparative Examples 1 and 2. The conditions for the charge and discharge test were: confining pressure (constant size) of 5 MPa, charging at 0.1 C, discharging at 1 C, and cutoff voltage of 3.0 V to 4.55 V, thus, the first time charging capacity and the first time discharging capacity were determined. The results are shown in Table 2. Also, the confining pressure of the evaluation battery was monitored upon the first charge, and the capacity at which the confining pressure begins to increase was confirmed using the anode active material as a reference. Further, the confining pressure at 4.55 V was measured, and the confining pressure increase from the state before charge and discharge was determined. The results are shown in Table 2. Incidentally, the results of the confining pressure increase in Table 2 are relative values regarding the result of Comparative Example 1 as 100. Also, the relation between void ratio and confining pressure increase is shown in FIG. 9.

TABLE 2

| | Void ratio (%) | Confining pressure increase (relative value) | Charging capacity (mAh/g) | Discharging capacity (mAh/g) | Capacity at which confining pressure begins to increase (mAh/g) |
|---|---|---|---|---|---|
| Example 1 | 4 | 84 | 235 | 184 | 625 |
| Example 2 | 12 | 80 | 236 | 182 | 628 |
| Example 3 | 21 | 78 | 233 | 184 | 630 |
| Example 4 | 38 | 76 | 234 | 182 | 632 |
| Comp. Ex. 1 | 0 | 100 | 234 | 189 | 599 |
| Comp. Ex. 2 | 0 | 625 | 235 | 185 | 87 |

As shown in Table 2, the charging capacity and the discharging capacity were almost the same in Examples 1 to 4 and Comparative Examples 1 and 2. That is, the active material obtained in Examples 1 to 4 was confirmed to exhibit similar performance as the conventional active material. However, in Examples 1 to 4 wherein the active material includes a void inside the primary particle, the capacity at which the confining pressure begins to increase, that is, non-expansion region was larger, and the confining pressure increase was also suppressed. It is believed that this is because the void inside the primary particle has absorbed the expansion. Incidentally, from the results of the XRD measurement, the active material in Examples 1 to 4 included the crystal phase of Type I silicon clathrate as a main phase. Here, since the crystal phase of Type II silicon clathrate may be obtained by further removing Na element from the crystal phase of Type I silicon clathrate, it is presumed that the non-expansion region is large and the confining pressure increase is suppressed also in the active material including the crystal phase of Type II silicon clathrate.

Incidentally, as shown in FIG. 9, the void ratio inside the primary particle and the confining pressure increase did not show a linear relationship. It is believed that this is because a part not likely to contribute to charge and discharge (that is, a part in a particle where an electron or an ion cannot reach) exists in the primary particle for a sample with many voids. As the result, it is believed that the occurrence of the charge and discharge reaction was concentrated at a part of the particle so that the expansion of the particle was increased locally.

REFERENCE SIGNS LIST

1 cathode layer
2 electrolyte layer
3 anode layer
4 cathode current collector
5 anode current collector
10 battery

What is claimed is:

1. An active material comprising a primary particle including a crystal phase of a Type I silicon clathrate as a main phase and optionally a crystal phase of a Type II silicon clathrate, and
the primary particle includes a void inside thereof, the void being observed with a SEM (scanning electron microscope), wherein
a void ratio inside the primary particle is in a range of from 4% to 40%.

2. The active material according to claim 1, wherein the crystal phase of the Type I silicon clathrate has a peak at a position of $2\theta=19.44°\pm1.00°$, $21.32°\pm1.00°$, $30.33°\pm1.00°$, $31.60°\pm1.00°$, $32.82°\pm1.00°$, $36.29°\pm1.00°$, $52.39°\pm1.00°$, and $55.49°\pm1.00°$ in X-ray diffraction measurement using a CuKα ray.

3. The active material according to claim 1, wherein the crystal phase of the Type II silicon clathrate is present in the active material and has a peak at a position of $2\theta=20.09°\pm1.00°$, $21.00°\pm1.00°$, $26.51°\pm1.00°$, $31.72°\pm1.00°$, $36.26°\pm1.00°$, and $53.01°\pm1.00°$ in X-ray diffraction measurement using a CuKα ray.

4. The active material according to claim 1, wherein the void ratio inside the primary particle is in a range of from 10% to 38%.

5. A battery comprising a cathode layer, an electrolyte layer, and an anode layer, in this order, and
the anode layer includes the active material according to claim 1.

6. A method for producing an active material according to claim 1, the method comprising steps of:
a preparing step of preparing a precursor compound including at least a Na element and a Si element, and having at least a Zintl phase; and
a heat treating step of heat treating the precursor compound, and
the heat treating step includes a temperature rising treatment of rising a temperature to a first temperature at a rate of 100° C./min or more under reduced pressure, and after the temperature rising, a burning treatment of burning under reduced pressure.

\* \* \* \* \*